(12) United States Patent
Muhonen et al.

(10) Patent No.: US 8,136,044 B2
(45) Date of Patent: Mar. 13, 2012

(54) METHOD, NETWORK SERVER AND COMPUTER PROGRAM FOR DETERMINING ADVERTISEMENT INFORMATION RELATING TO MAP INFORMATION

(75) Inventors: Ahti Muhonen, Hirvihaara (FI); Juha Salo, Littoinen (FI); Matthew Snyder, Vancouver (CA)

(73) Assignee: Core Wireless Licensing S.a.r.l., Luxembourg (DE)

( * ) Notice: Subject to any disclaimer, the term of this patent is extended or adjusted under 35 U.S.C. 154(b) by 395 days.

(21) Appl. No.: 11/647,421

(22) Filed: Dec. 29, 2006

(65) Prior Publication Data

US 2008/0162534 A1 Jul. 3, 2008

(51) Int. Cl.
*G06F 3/14* (2006.01)
(52) U.S. Cl. ........ 715/764; 715/853; 715/854; 715/744; 707/722; 707/724; 709/217
(58) Field of Classification Search .................. 715/753, 715/754, 744, 764; 707/722, 724
See application file for complete search history.

(56) References Cited

U.S. PATENT DOCUMENTS

| | | | |
|---|---|---|---|
| 2004/0224703 A1* | 11/2004 | Takaki et al. | 455/457 |
| 2005/0071421 A1* | 3/2005 | Calo et al. | 709/203 |
| 2005/0270311 A1 | 12/2005 | Rasmussen et al. | |
| 2006/0089160 A1* | 4/2006 | Othmer | 455/457 |
| 2006/0200384 A1 | 9/2006 | Arutunian et al. | |
| 2006/0271281 A1* | 11/2006 | Ahn et al. | 701/208 |
| 2007/0083408 A1* | 4/2007 | Altberg et al. | 705/7 |
| 2007/0100802 A1 | 5/2007 | Celik | |
| 2007/0233375 A1* | 10/2007 | Garg et al. | 701/211 |
| 2007/0260508 A1* | 11/2007 | Barry et al. | 705/14 |
| 2008/0109159 A1* | 5/2008 | Shi et al. | 701/208 |

FOREIGN PATENT DOCUMENTS

WO WO2004/063950 A1 7/2004

* cited by examiner

*Primary Examiner* — Don Wong
*Assistant Examiner* — Tuan-Khanh Phan
(74) *Attorney, Agent, or Firm* — Ditthavong Mori & Steiner, P.C.

(57) ABSTRACT

The invention relates to a solution in which advertisement icons displayed together with map information relate to the displayed map information. In one embodiment of the invention, some or all of the advertisement icons are from service providers situated within the geographical area displayed by the map information.

19 Claims, 6 Drawing Sheets

| | | 204 | 216 | 218 | |
|---|---|---|---|---|---|
| Add 7 | Add 2 | Add 3 | Add 8 ① | Add 9 ② | Add 6 |
| Add n | Zoom level + — | | | | ... |
| ... | | ① | | | |
| | | | | ② | |
| | | | | | |
| | | | | | |

METHOD, NETWORK SERVER AND COMPUTER PROGRAM FOR DETERMINING ADVERTISEMENT INFORMATION RELATING TO MAP INFORMATION

BACKGROUND OF THE INVENTION

1. Field of the Invention

The invention relates to data communications. In particular, the invention relates to a novel and improved method, network server and computer program for determining advertisement information relating to map information.

2. Description of the Related Art

The Internet and especially the World Wide Web have become popular as a provider of different services. Many service providers provide their services via electronic commerce or via other types of services. One of the many services provided via the World Wide Web is a map service.

A typical map service is an interactive service with which a user is able to access map information on desired geographical locations. Examples of the map services include a route finder (from a location A to B) and an address finder (a specific location).

Since the World Wide Web is a world wide service, it offers an exceptionally powerful way to convey information. It also offers many ways for advertising different services or products. The advertising of services or products has also been combined with many map services provided via the World Wide Web.

An example of such map services is the Yahoo Maps. In the Yahoo Maps outside the map area (e.g. below the map) is shown one or more advertisement icons. The icons shown are typically selected from a set advertisement based on different criteria, e.g. an advertising contract. When a user clicks on an advertisement and when the current map is scaled so that the map area currently shown to the user does not include the location of the service provider of the clicked advertisement, the map automatically scales to a scale in which that includes also one or more geographical locations of the services provider.

Although there are many map services that combine advertisements to the provided map information, the use of the advertisements is not optimal.

SUMMARY OF THE INVENTION

The invention relates to a solution in which advertisement icons displayed together with map information relate to the displayed map information. In one embodiment of the invention, some or all of the advertisement icons are from service providers situated within the geographical area displayed by the map information.

According to a first aspect of the invention, there is provided a method comprising: receiving, with a network server from a web browser, a map information request; determining, with the network server, based on at least one criterion a set of advertisements relating to the requested map information; sending the requested map information and the determined set of advertisements to the web browser; receiving a zoom or transition request of the previously sent map information; determining, with the network server, based on at least one criterion a new set of advertisements relating to the requested map information; and sending the requested map information and the new set of advertisements to the web browser.

According to a second aspect of the invention, there is provided a network server comprising: a map application; a map information storage connected to the map application or a connection to the map information storage; and an advertisement storage connected to the map application or a connection to the advertisement storage. The map application is configured to: receive, from a web browser, a map information request; determine based on at least one criterion a set of advertisements relating to the requested map information; send the requested map information and the determined set of advertisements to the web browser; receive a zoom or transition request of the previously sent map information; determine based on at least one criterion a new set of advertisements relating to the requested map information; and send the requested map information and the new set of advertisements to the web browser.

According to a third aspect of the invention, there is provided a computer program comprising code adapter to perform the following steps when executed in a data processing device: receiving, from a web browser, a map information request; determining based on at least one criterion a set of advertisements relating to the requested map information; sending the requested map information and the determined set of advertisements to the web browser; receiving a zoom or transition request of the previously sent map information; determining based on at least one criterion a new set of advertisements relating to the requested map information; and sending the requested map information and the new set of advertisements to the web browser.

In one embodiment of the invention, the at least one criterion comprises at least one of the following: a service provider of an advertisement is situated within a geographical area determined by the requested map information; a priority list determining which advertisements relating to the requested map information are to be sent to the web browser; proximity of a service provider of an advertisement outside the requested map information; and a requested service or product category.

In one embodiment of the invention, the requested map information and the new set of advertisements to the web browser are sent in a form that the map information is surrounded by the new set of advertisements.

In one embodiment of the invention, the requested map information and the determined set of advertisements to the web browser are sent in a form that the map information is surrounded by the set of advertisements.

In one embodiment of the invention, the computer program is embodied on a computer readable medium.

The benefits of the invention relate to improved correspondence between map information and the related advertisement information displayed in the proximity of the map information.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
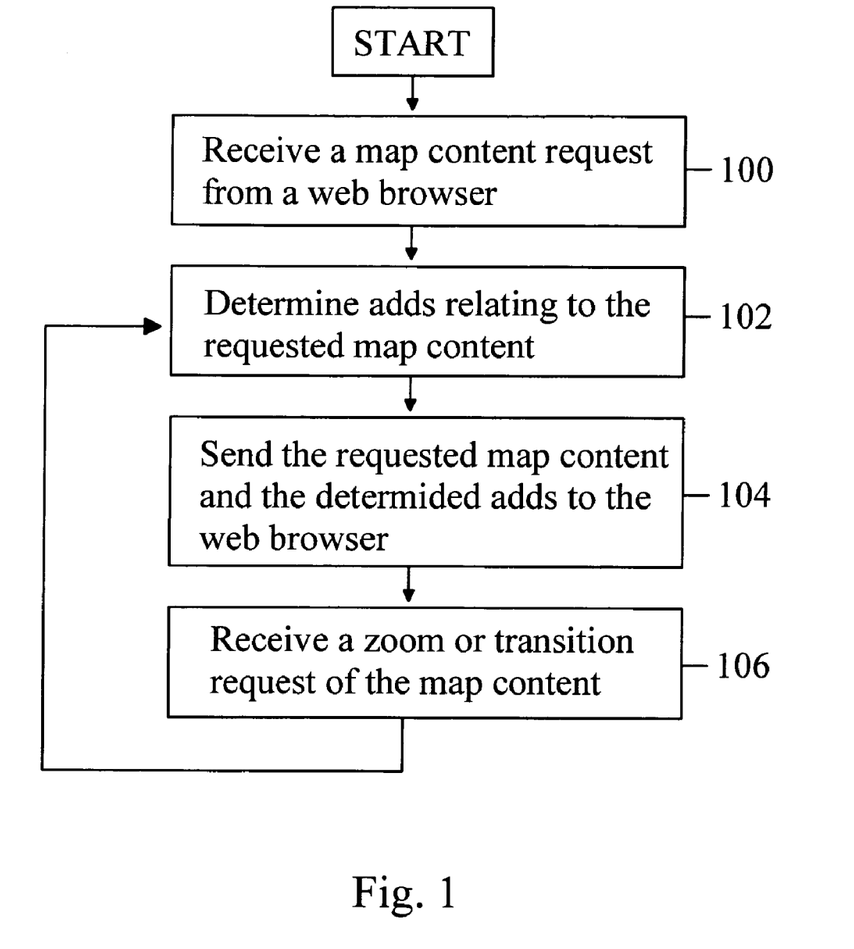
FIG. 1 discloses a flow chart according to one embodiment of the invention.

FIG. 1 discloses a flow chart according to one embodiment of the invention. In step 100 a server application running in a web server receives a map content request from a web browser running on a computer, e.g. a personal or laptop computer. The server application determines, based on at least one predetermined condition, one or more advertisements relating to the requested map content, step 102. The requested map content and the determined advertisements are sent to the web browser, step 104. In step 106, the server application receives a zoom or transition request of the map content. The zoom request refers to a request that either requests zoomed out or zoomed in content in proportion to the previously sent map content to the web browser. The transition request refers to a request that requests to 'move' the previously sent map content to a requested direction, the zoom level remaining the same as in the previously sent map content. In response to the request received in step 106, the web server again determines advertisements relating to the requested map content and sends the requested map content and the determined advertisements to the web browser.

In one embodiment of the determination step 102 of FIG. 1, the advertisements to be sent to the web browser are determined based on geographical location of the service providers of the advertised products or services in proportion to the requested map content. In other words, in one embodiment, when the user of the web browser zooms in or out in the map, the advertisement icons change to those whose service providers are geographically situated within the map area which is shown by the web browser.

In one embodiment of the invention, the order and that fact which advertisement(s) will be sent to the browser, may determined based on various basis. For example, the user may want to see only advertisements from services providers of a certain category (e.g. hotel, shopping center, car dealer etc.). On the other hand, the advertised icons may be based on a priority list, e.g. based on the amount of money paid for the advertisement. The advertisement shown to the user may also be randomly chosen from a group of service providers that are situated within the geographical area relating to the request from the web browser.

In one embodiment of the invention, all the advertisement icons displayed by the web browser are not located within the chosen map view. In this case it is possible to show one or more of the closest service providers outside the shown map area with e.g. arrows pointing to the map area edge where the place can be found outside the map.

Figure 2A:
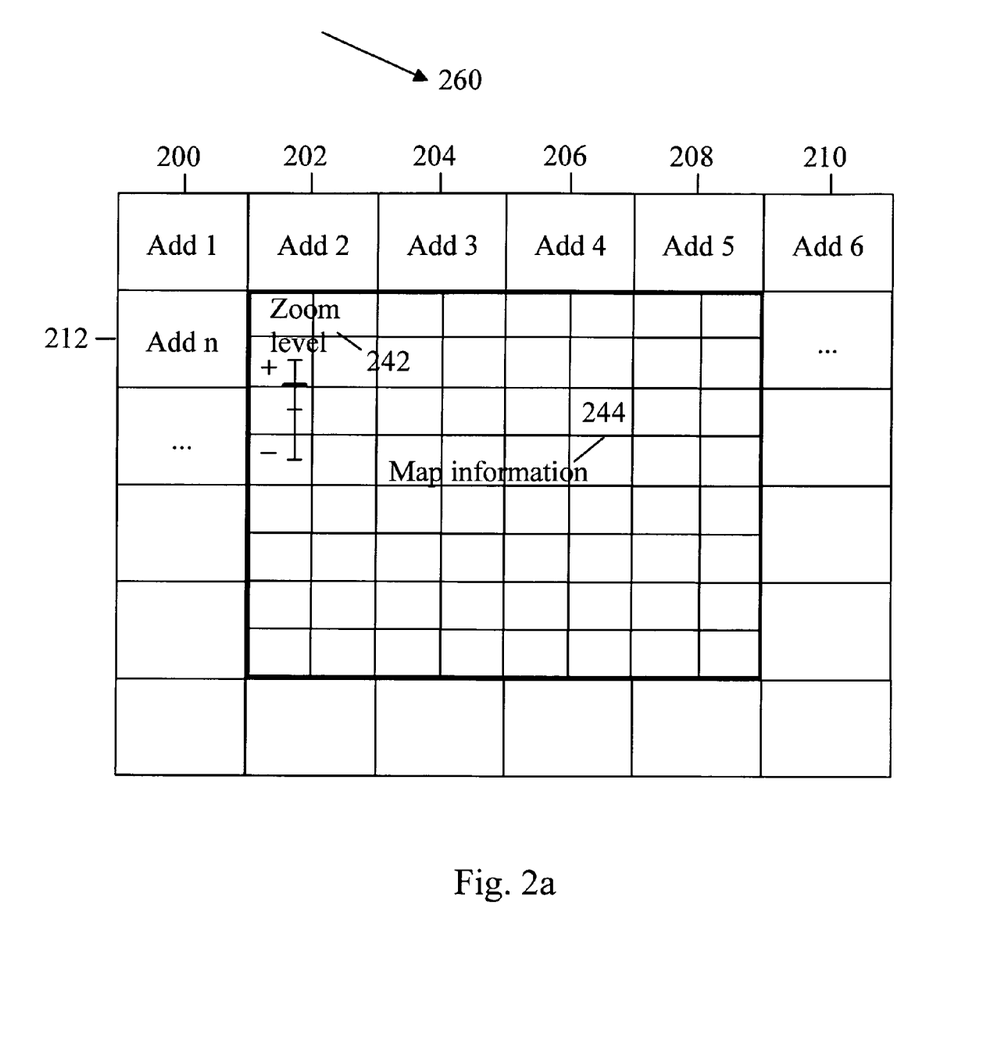
FIG. 2a discloses one embodiment of a map view according to the invention.
Figure 2B:
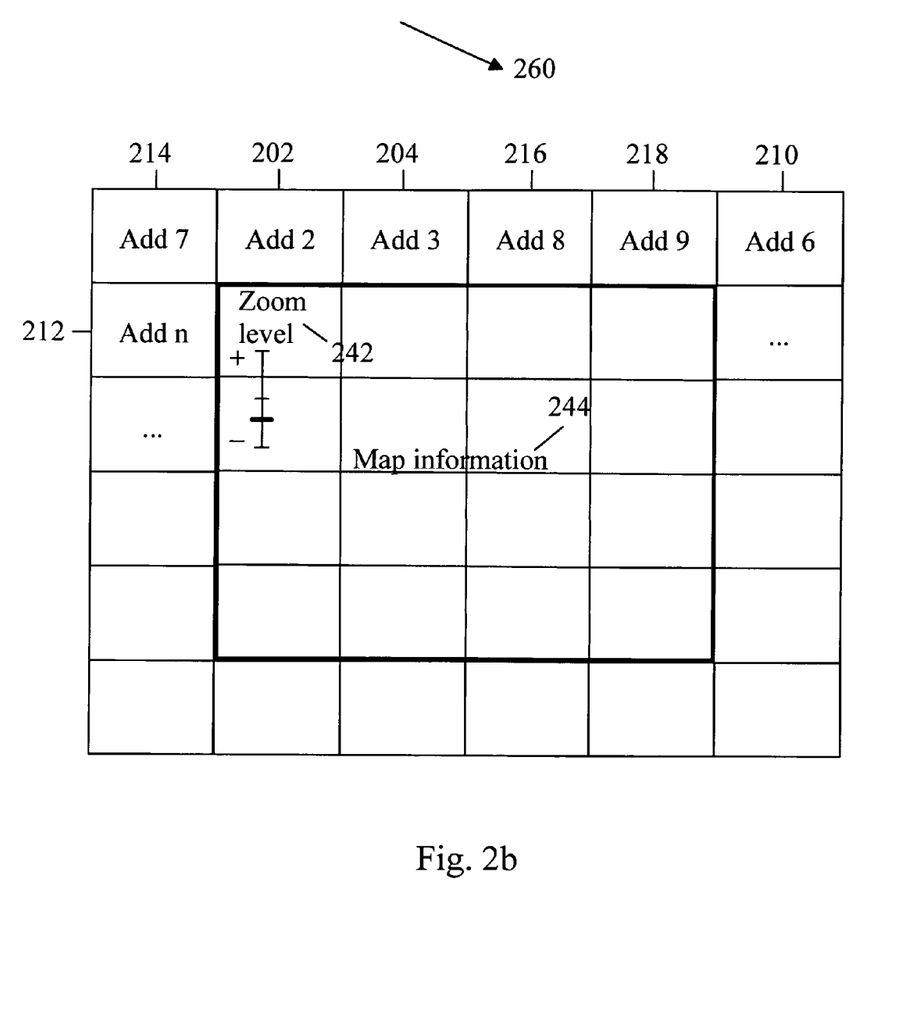
FIG. 2b discloses a map view according one embodiment to the invention.

FIGS. 2a and 2b disclose a map view according to one embodiment of the invention. The map view 260 is in one embodiment displayed on a display of a computer, personal digital assistant or a mobile device with a web browser of the particular device. The map view 260 comprises two main areas: an advertisement area and a map information area 244. In the embodiment disclosed in FIGS. 2a and 2b, the map information area 244 is surrounded by the advertisement area. In FIG. 2a the advertisement area comprises advertisement icon tiles 200-212 that make a frame to the map information area 244. A zoom level indicator 242 identifies the current level of zooming. The more the slide control of the zoom level indicator 242 is on the '+' side, the more accurate and detailed the map will be. In this embodiment, FIG. 2a displays a more detailed map than FIG. 2b.

In FIG. 2b, some or all of the advertisement icon tiles 200-212 change according to the zoom level 242 of the map information 244. When comparing the advertisement icon tiles in FIGS. 2a and 2b, it can be seen that advertisement icon tiles 200, 206 and 208 of FIG. 2a have been replaced with advertisement icon tiles 214, 216 and 218 in FIG. 2b.

When an individual advertisement icon tile is clicked e.g. with a mouse of a computer displaying the map view 244, there may be a predetermined response action in response to the click. The predetermined response action may e.g. be one of the following: click to call, additional information about the advertisement or advertiser, a coupon to be sent e.g. to a mobile terminal etc.

Figure 2C:
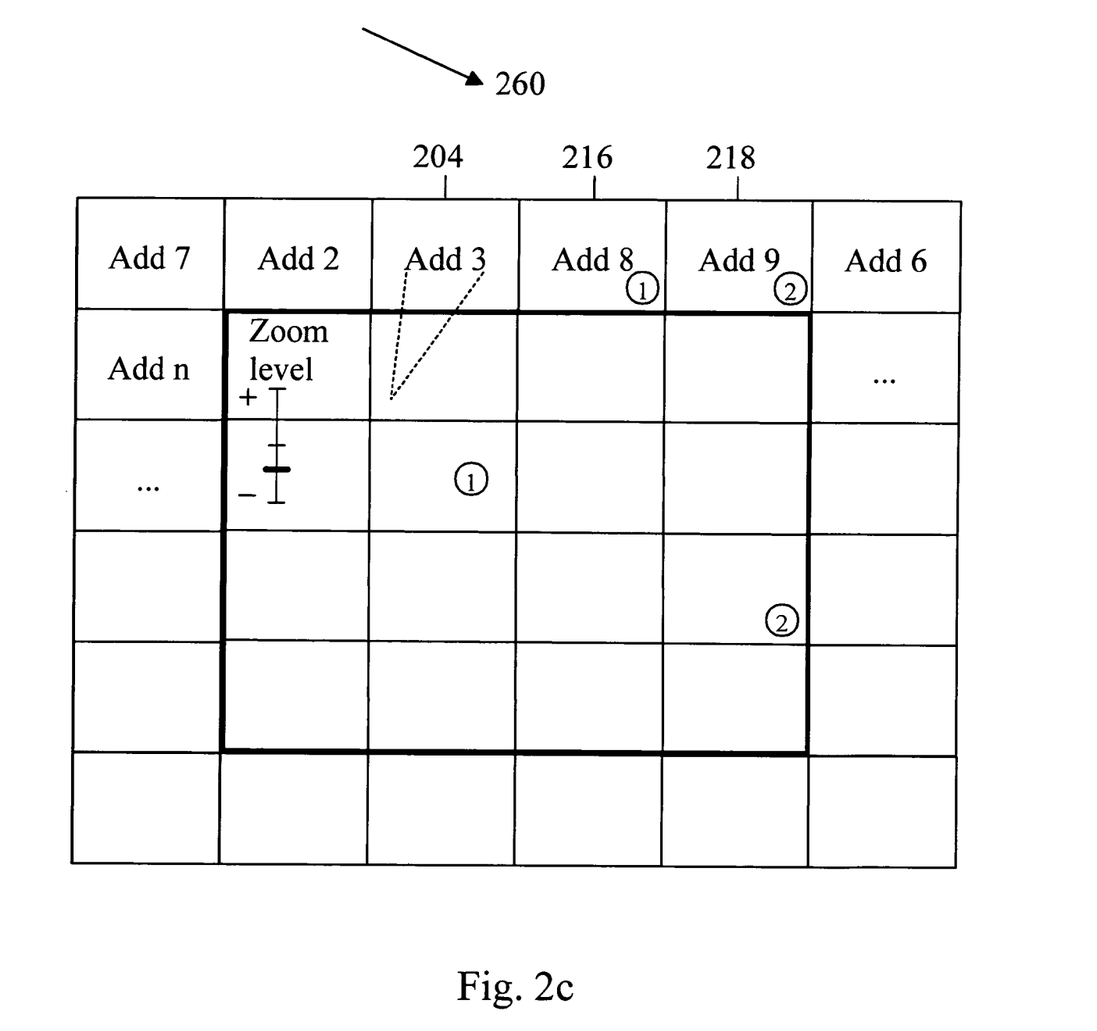
FIG. 2c discloses a map view according to another embodiment of the invention.

FIG. 2c discloses another embodiment for indicating a geographical location of a service provider of an advertisement. An advertisement icon tile 204 represents an advertisement of one service provider. The geographical location (e.g. an address) on the map is indicated with a line or lines starting from the advertisement 204 and ending to the exact geographical location. Yet another way to indicate the geographical location of a service provider is to mark an advertisement with some appropriate symbol and use the same symbol in the exact geographical location on the map. In FIG. 2c advertisements 216 and 218 have been marked with individual numbers. The same individual numbers are correspondingly used on the map in corresponding geographical locations.

Figure 2D:
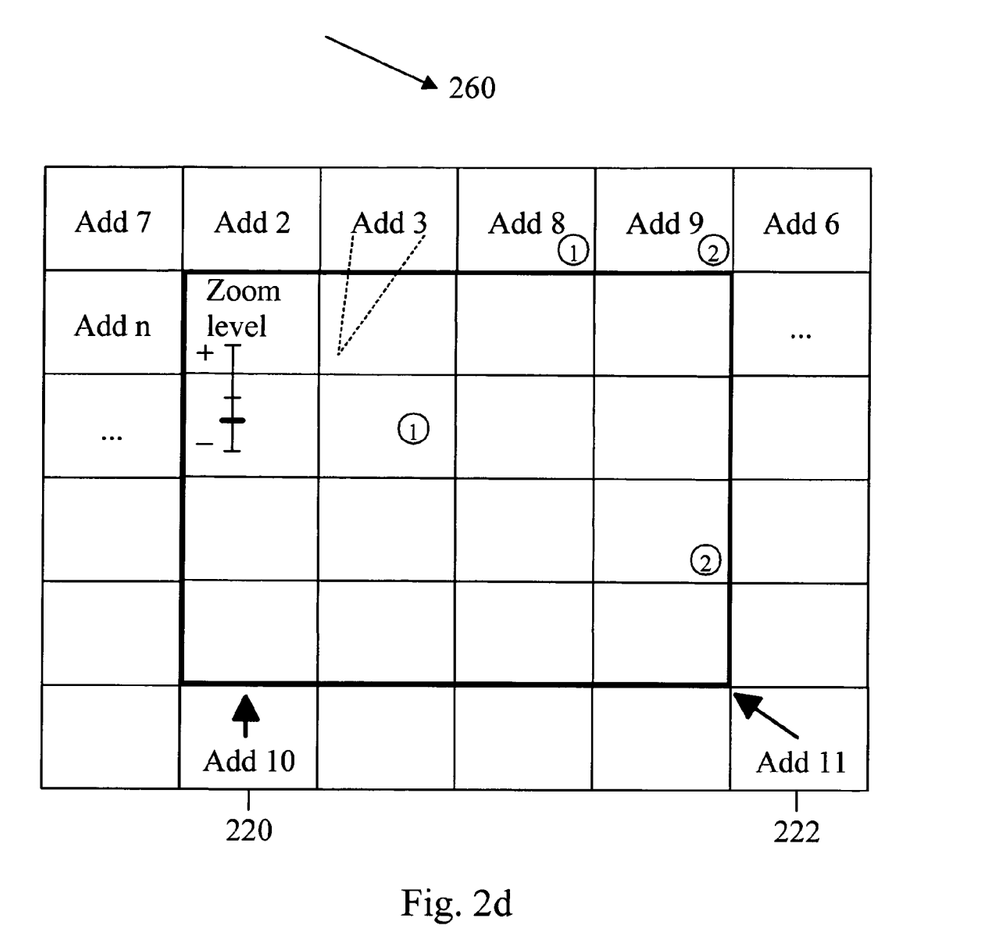
FIG. 2d discloses a map view according to another embodiment of the invention.

FIG. 2d discloses yet another embodiment for indicating a geographical location of a service provider of an advertisement. In one embodiment, if possible all the advertisement icons that are sent to the web browser from the network server are of service providers that are located within the current map area shown to the user. If there are no advertisement icons to be shown to the user or if there are additional advertisement space in addition to the advertisements of the service providers that are located within the current map area shown to the user, it is also possible to show advertisement icons of N closest service providers that are located outside the currently shown map area. In FIG. 2d advertisement icons 220 and 222 relate to service providers whose exact geographical location is outside the map view shown to a user. Therefore, the advertisements 220 and 222 are preferable positioned so that the position of the advertisement icon reflects the direction in which the service provider of the advertisement geographically is situated. It is also possible to use further indications (e.g. arrows as disclosed in FIG. 2d) to indicate that such service providers are situated outside the shown map area.

In FIGS. 2a-2d it has been disclosed that the advertisements have been arranged as tiles around the map information area. It is evident to a man skilled in the art that it is possible to arrange the advertisements outside the map information area into any appropriate form or place.

Figure 3:
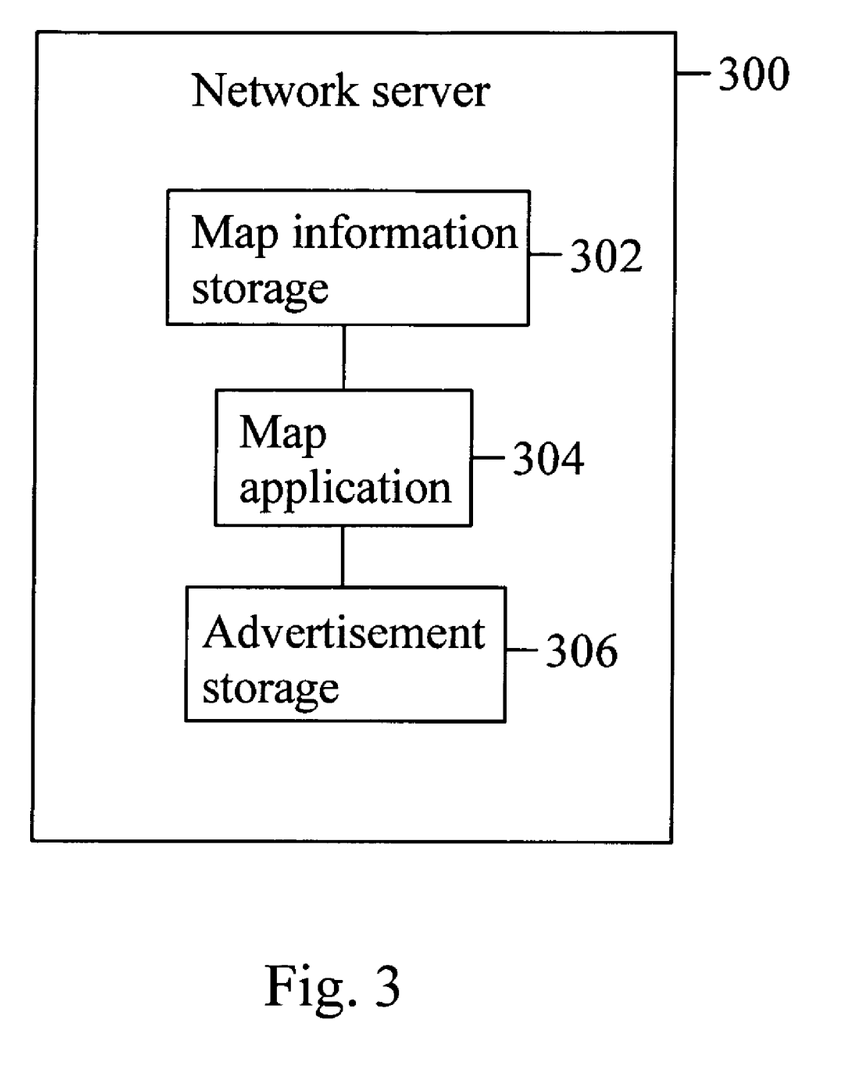
FIG. 3 discloses a block diagram of a network server according to one embodiment of the invention.

FIG. 3 discloses a block diagram of a network server according to one embodiment of the invention. The network server 300 is equipped with appropriate protocols (e.g. Transmission Control Protocol/Internet Protocol (TCP/IP), HyperText Transfer Protocol (HTTP) etc.) to connect to a data network, e.g. to the Internet. The network server 300 comprises a map application 304, a map information storage 302 connected to the map application 304 and an advertisement storage 306 connected to the map application 304. The map application 304 is configured to receive map information requests from the data network and correspondingly send the requested map information to the sender of the request together with advertisement information via the data network. The determination of advertisement information has been disclosed in the embodiments in FIGS. 1 and 2a-2d.

It is possible, in one embodiment of the invention, to distribute at least one of the map information storage 302 and the advertisement storage 306 into separate network elements that are connected to the network server 300.

It is evident to a man skilled in the art that the actual form of data sent to the web browser may vary depending on the implementation. The data may be sent to the web browser e.g. within a HTTP page, a flash object, a java applet etc.

The network server 300 disclosed in FIG. 3 may comprise a memory or memories that may refer to a single memory or memory area or to a plurality memories or memory areas that may include e.g. random access memories (RAM), read-only memories (ROM) etc. The memory may also include other applications or software components that are not described in more detail and also may include the computer program (or portion thereof), which when executed on a central processing unit performs at least some of the steps disclosed in the invention. The central processing unit may also include memory or a memory may be associated therewith which may include the computer program (or portion thereof) which when executed on the central processing unit performs at least some of the steps disclosed in the invention.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A method comprising:
   receiving, by a network server, a request for map information;
   determining, by the network server, based on at least one criterion, a set of advertisements relating to the requested map information;
   causing, at least in part, sending the requested map information and the determined set of advertisements; and
   causing, at least in part, displaying, within a map view area of a display, a map image corresponding to the requested map information that shows indicators relating to locations of providers associated with the determined set of advertisements, and displaying the determined set of advertisements in a separate area of the display surrounding the map view area; and
   wherein the determined set of advertisements includes at least one advertisement associated with a provider of a location outside of the map image, the method further comprising causing, at least in part, displaying the at least one advertisement at a position within the separate area of the display surrounding the map view area of the display, where the position indicates a direction, relative to the map image, of the location of the provider outside the map image.

2. The method according to claim 1, wherein the at least one criterion comprises at least one of the following:
   providers associated with the set of advertisements situated within a geographical area determined by the requested map information;
   a priority list associated with the determined set of advertisements;
   proximity, relative to the map image, of providers associated with the set of advertisements situated outside the geographical area determined by the requested map information; and
   a requested service or product category.

3. The method according to claim 1, wherein the step of sending comprises sending the requested map information and the determined set of advertisements in a form whereby the map information is surrounded by the set of advertisements.

4. An apparatus comprising:
   at least one processor; and
   at least one memory including computer program code for one or more programs,
   the at least one memory and the computer program code configured to, with the at least one processor, cause the apparatus to perform at least the following:
      generate receive, from a browser, a request for map information request;
      receive the requested map information and a set of advertisements relating to the requested map information, wherein the set of advertisements was determined based on at least one criterion; and
      cause, at least in part, displaying, within a map view area of a display, a map image corresponding to the requested map information that shows indicators relating to locations of providers associated with the determined set of advertisements, and displaying the determined set of advertisements in a separate area of the display surrounding the map view area; and
      wherein the determined set of advertisements includes at least one advertisement associated with a provider of a location outside of the map image, the apparatus is further caused to cause, at least in part, displaying the at least one advertisement at a position within the separate area of the display surrounding the map view area, where the position indicates a direction, relative to the map image, of the location of the provider outside the map image.

5. The apparatus according to claim 4, wherein the at least one criterion comprises at least one of the following:
   providers associated with the set of advertisements situated within a geographical area determined by the requested map information;
   a priority list associated with the determined set of advertisements;
   proximity, relative to the map image, of providers associated with the set of advertisements situated outside the geographical area determined by the requested map information; and
   a requested service or product category.

6. The apparatus according to claim 4, wherein the requested map information and the determined set of advertisements are received in a form whereby the map information is surrounded by the set of advertisements.

7. A computer-readable storage medium carrying one or more sequences of one or more instructions which, when executed by one or more processors, cause an apparatus to at least perform the following steps:
   generating a request for map information;
   receiving the requested map information and a set of advertisements relating to the requested map information, wherein the set of advertisements was determined based on at least one criterion; and
   causing, at least in part, displaying, within a map view area of a display, a map image corresponding to the requested map information that shows indicators relating to locations of providers associated with the determined set of advertisements, and displaying the determined set of advertisements in a separate area of the display surrounding the map view area; and wherein the determined set of advertisements includes at least one advertisement associated with a provider of a location outside of the map image, the apparatus is further caused to perform displaying the at least one advertisement at a position within the separate area of the display surrounding the map view area, where the position indicates a direction, relative to the map image, of the location of the provider outside the map image.

8. The computer-readable storage medium of claim 7, wherein the at least one criterion comprises at least one of the following:
providers associated with the set of advertisements situated within a geographical area determined by the requested map information;
a priority list associated with the determined set of advertisements;
proximity, relative to the map image, of providers associated with the set of advertisements situated outside the geographical area determined by the requested map information; and
a requested service or product category.

9. The computer-readable storage medium of claim 7, wherein the requested map information and the determined set of advertisements are received in a form whereby the map information is surrounded by the set of advertisements.

10. A network server comprising:
a map application module configured to run a map application;
a map information storage configured to store map information;
an advertisement storage configured to store advertising information;
wherein the map application module is further configured to:
receive a request for map information;
determine based on at least one criterion a set of advertisements relating to the requested map information; and
cause, at least in part, sending the requested map information and the determined set of advertisements to a device;
wherein the requested map information and the determined set of advertisements are sent to the device for display, within a map view area, a map image corresponding to the requested map information that shows indicators relating to locations of providers associated with the determined set of advertisements, and display of the determined set of advertisements in a separate area surrounding the map view area; and
wherein the determined set of advertisements includes at least one advertisement associated with a provider of a location outside of the map image, the requested map information and the determined set of advertisements are sent to the device for further display of the at least one advertisement at a position within the separate area surrounding the map view area, where the position indicates a direction, relative to the map image, of the location of the provider outside the map image.

11. The network server according to claim 10, wherein the at least one criterion comprises at least one of the following:
providers associated with the set of advertisements situated within a geographical area determined by the requested map information;
a priority list associated with the determined set of advertisements;

proximity, relative to the map image, of providers associated with the set of advertisements situated outside the geographical area determined by the requested map information; and
a requested service or product category.

12. The method according to claim 1, further comprising:
receiving a zoom or transition request relating to the requested map information;
determining, by the network server, based on the at least one criterion, a new set of advertisements relating to new map information resulting from the zoom or transition request;
causing, at least in part, sending the new map information and the new set of advertisements; and
causing, at least in part, displaying, within the map view area of the display, a new map image corresponding to the new map information, wherein the indicators relate to locations of providers associated with the new set of advertisements, and displaying the new set of advertisements in the separate area of the display surrounding the map view area.

13. The apparatus according to claim 4, wherein the apparatus is further caused to:
generate a zoom or transition request relating to the requested map information;
receive new map information resulting from the zoom or transition request and a new set of advertisements relating to the new map information, wherein the new set of advertisements were determined based on the at least one criterion; and
cause, at least in part, displaying, within the map view area of the display, a new map image corresponding to the new map information, wherein the indicators relate to locations of providers associated with the new advertisements, and displaying the new advertisements in the separate area of the display surrounding the map view area.

14. The computer-readable storage medium of claim 7, wherein the apparatus is further caused to perform:
generating a zoom or transition request relating to the requested map information;
receiving new map information resulting from the zoom or transition request and a new set of advertisements relating to the new map information, wherein the new set of advertisements were determined based on the at least one criterion; and
causing, at least in part, displaying, within the map view area of the display, a new map image corresponding to the new map information, wherein the indicators relate to locations of providers associated with the new advertisements, and displaying the new advertisements in the separate area of the display surrounding the map view area.

15. The network server according to claim 10, wherein the network server is further caused to:
receive a zoom or transition request relating to the requested map information;
determine based on the at least one criterion a new set of advertisements relating to new map information resulting from the zoom or transition request; and
cause, at least in part, sending the new map information and the new set of advertisements to the device; and
wherein the new map information and the new set of advertisements are sent to the device for display, within the map view area of the display, a new map image corresponding to the new map information, wherein the indicators relate to locations of providers associated with the new set of advertisements, and displaying the new set of advertisements in the separate area of the display surrounding the map view area.

16. The method according to claim 1, wherein one or more of the indicator for each advertisement and the display of each advertisement is associated with an action initiated by a selection thereof.

17. The apparatus according to claim 4, wherein one or more of the indicator for each advertisement and the display of each advertisement is associated with an action initiated by a selection thereof.

18. The computer-readable storage medium of claim 7, wherein one or more of the indicator for each advertisement and the display of each advertisement is associated with an action initiated by a selection thereof.

19. The network server according to claim 10, wherein one or more of the indicator for each advertisement and the display of each advertisement is associated with an action initiated by a selection thereof.

\* \* \* \* \*